United States Patent [19]

Wier

[11] Patent Number: 4,844,646

[45] Date of Patent: Jul. 4, 1989

[54] CLAMP MEMBERS

[76] Inventor: Jan H. Wier, "Burleigh", Bulls, New Zealand

[21] Appl. No.: 60,281

[22] Filed: Jun. 10, 1987

[30] Foreign Application Priority Data

Jun. 10, 1986 [NZ] New Zealand .................. 216465

[51] Int. Cl.⁴ .................................... F16B 1/00
[52] U.S. Cl. .................................. 403/24; 403/374; 403/409.1; 256/48
[58] Field of Search .............. 403/374, 409.1, 358, 403/314, 24; 174/163 F, 158 F; 256/48

[56] References Cited

U.S. PATENT DOCUMENTS

| | | | |
|---|---|---|---|
| 443,627 | 12/1890 | Nicholson | 403/314 |
| 1,103,403 | 7/1914 | Duckworth | 403/358 |
| 4,214,793 | 7/1980 | Gargrave | 403/409.1 X |

FOREIGN PATENT DOCUMENTS

| | | | |
|---|---|---|---|
| 434436 | 9/1926 | Fed. Rep. of Germany | 403/374 |
| 1443330 | 7/1976 | United Kingdom | 174/163 F |

Primary Examiner—Andrew V. Kundrat
Attorney, Agent, or Firm—Fleit, Jacobson, Cohn, Price, Holman & Stern

[57] ABSTRACT

This invention describes and claims a new clamp member able to be releasably engaged upon a substantially circular (in cross section) shaft (e.g. a post) with a relatively smooth surface. The clamp member includes a collar member with a shaft comprising a longitudinal recess to accommodate the elongate member and at least one integral recess tapered with respect to the longitudinal axis of the elongate member. A wedge member is positioned in the integral recess of the collar member between the inner surface of the collar and the surface of the elongate member. The inner surface of said wedge member is provided with two spaced apart areas of contact with the elongate member which areas of contact have tangent planes which are at an oblique angle one to the other. The outer surface of the wedge member is shaped to substantially correspond with the recess in the collar member, to provide an interface in which the included angle defined by any tangent planes of the recess—wedge interface substantially exceeds the included angle defined by any tangent planes to the elongate member—wedge member interface area. The arrangement of the invention is such that in use, the inner surface of the wedge member is substantially aligned with the surface of the elongate member by movement of the collar member in one direction. The two spaced apart areas of contact on the inner surface of the wedge member are by this movement frictionally engaged on the elongate member. The inner surface of the collar member then moves into frictional engagement with the outer surface of the wedged member to frictionally engage the collar member on the clamp member and elongate member. The clamp member is disengageable from the elongate member by moving the collar member in the opposite direction. Various embodiments are also described and claimed.

21 Claims, 3 Drawing Sheets

CLAMP MEMBERS

DESCRIPTION OF THE INVENTION

This invention provides a method of releasably clamping a clamp member on an elongate member so that the clamp member can be constrained from longitudinal movement along the elongate member in one or both directions. The invention more particularly concerns an improved method of clamping fittings onto smooth shafts such as rounded steel or fibreglass fence posts, and provides various forms of clamp member which are able to perform the method of the invention.

BACKGROUND TO THE INVENTION

A wide variety of apparatus adapted to lock clamp members or collar members onto smooth shafts have been known in the art, including (but not limited to) radially disposed "grub screws"; locking rings which pivot in a manner such that attempted movement along the shaft results in the locking ring/s being forced into tighter contact with the shaft through a cantilever action; interlocking cones which can be wedged either actively or passively, into frictional engagement with the shaft and one another; bands which can be constricted around the shaft by means of threads or camlever systems.

These apparatus suffer from one or more of the following deficiencies: they are relatively expensive to manufacture; they can damage the surface of the shaft because of point loadings with hard materials; they often need a tool in order to be adjusted; they may be restricted to locking the collar in one direction only; they may be sensitive to changes in the frictional coefficients of the mating materials induced by the presence of moisture or oil; they are often non-self-locking so they rely on the original clamping force generated and are thus susceptible to the effect of creep in materials caused by high temperatures and/or prolonged used; they are commonly bulky in design and can be slow and/or difficult to adjust.

It is accordingly an object of this invention to provide a clamp member and a method of locking a clamp member onto an elongate member which goes at least some way towards overcoming the problems with apparatus known in the art.

According to this invention there is provided a clamp member including a collar member including a internal shaft, the internal shaft comprising a longitudinal recess to accommodate a substantially circular (in cross section) elongate member and at least one integral recess tapered with respect to the longitudinal axis of the elongate member; and at least one wedge member adapted, in use, to be positioned in the integral recess of the collar member between the inner surface of the collar and the surface of the elongate member; wherein the inner surface of said wedge member is shaped to provide at least two spaced apart areas of contact with the elongate member which areas of contact have tangent planes which are at an oblique angle one to the other; and wherein the outer surface of the wedge member is shaped to substantially correspond with the recess in the collar member, to provide an interface in which the included angle defined by any tangent planes of the recess-wedge interface substantially exceeds the included angle defined by any tangent planes to the elongate member-wedge member interface area, the arrangement being such that, in use the inner surface of the wedge member is substantially aligned with the surface of the elongate member by movement of the collar member in one direction, whereupon the two spaced apart areas of contact on the inner surface of the wedge member are frictionally engaged on the elongate member and the inner surface of the collar member is moved into frictional engagement with the outer surface of the wedge member to frictionally engage the collar member on the clamp member and elongate member; the clamp member being disengageable from the elongate member by moving the collar member in the opposite direction.

According to a further aspect of this invention there is provided a clamp member as described in the preceding paragraph wherein the longitudinal recess is tapered outwardly from one or both ends of the collar member and wherein the wedge member has an inner surface engageable with the elongate member and an outer surface which is tapered from both ends substantially to correspond with the taper of the inner surface of the collar member.

According to a further aspect of the invention the longitudinal recess in the clamp member is tapered from one or both ends of the collar member and wherein the inner surface of the wedge member is, in cross section, of a lesser radius than the radius of the substantially circular (in cross section) elongate member to be inserted therein, the wedge member thus being adapted to contact the surface of the elongate member at the two areas of contact, the tangents of which are disposed at an oblique angle one to the other, the outer surface of the wedge member being tapered from both ends substantially to correspond with the taper of the inner surface of the collar member.

In a further preferred embodiment of the invention the wedge member is constructed from an at least partially resilient material, in order that outer portions of the curved inner surface of the wedge member are adapted to be wedged at least partially apart, in use, the wedge member thus being adapted to be held in constant compression within the recess in the collar member, in order to accommodate variations in the diameter of the elongate member or surface irregularities of the elongate member.

A further possible embodiment the clamp member includes an upstanding ridge or a recess on the inner surface of the wedged member, the ridge or the recess being positioned substantially between the two spaced apart areas of contact of the wedge member, the ridge or recess portion being adapted to engage a corresponding recess or ridge provided on the surface of the elongate member, the arrangement being such that the inner surface of the wedge member is engageable with the elongate member, while at the same time the collar member is moveable relative to the outer surface of the wedge member.

In one preferred application of the invention the clamp member is adapted to engage an elongate member in the form of a substantially circular (in cross section) fibreglass fencepost, wherein the collar member is provided with appropriate means to locate a fence wire, and wherein the collar member and wedge member are formed of an at least partially resilient plastic material which enables the clamp member to accommodate variations in the outer circumference of the substantially circular fence post.

Further according to this invention there is provided a method of clamping a clamp member on an elongate member, wherein said clamp member includes a collar member with an internal shaft, the internal shaft comprising a longitudinal recess to accommodate an elongate member and least one integral recess tapered with respect to the longitudinal axis of the elongate member, and at least one wedge member adapted to be positioned in the integral recess in the collar member between the inner surface of the collar member and the surface of the elongate member, comprising the steps of the substantially aligning the inner surface of the wedge member with the surface of the elongate member by movement of the collar member in a first direction, the inner surface of the wedge member becoming frictionally engaged with the surface of the elongate member and the collar member becoming frictional engaged with the tapered outer surface of the wedge member, thereby clamping on to the elongate member, and wherein the clamp member is disengageable from the elongate member by movement in the opposite direction.

The invention will now be described with reference to the accompanying drawings in which:

FIG. 1 is a simplification of the clamp member including the collar member the wedge member and the elongate member as follows;

a. which is a diagramatic end view; and b. which is a mathematical representation of a longitudinal cross section of clamp member FIG. 2 which is a cross section and mathematical representation of the apparatus described in FIG. 1;

Figure 1A:
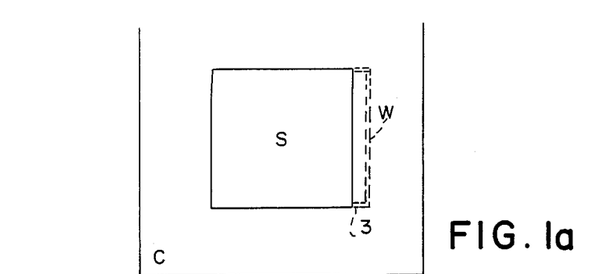
Figure 3:
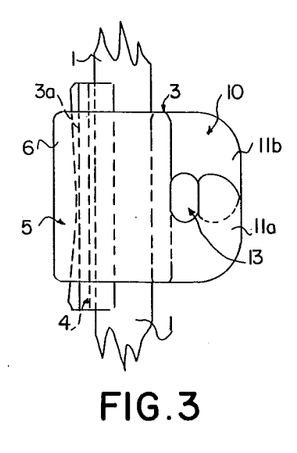
Figure 4:
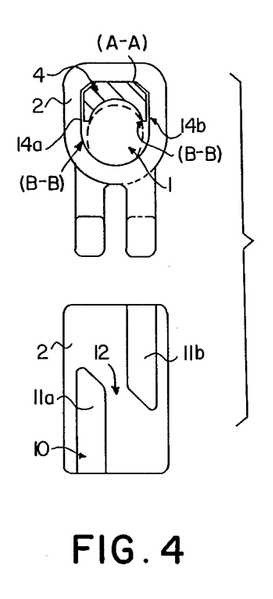
Figure 5:
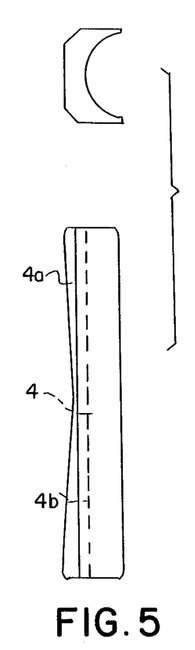
Figure 6:
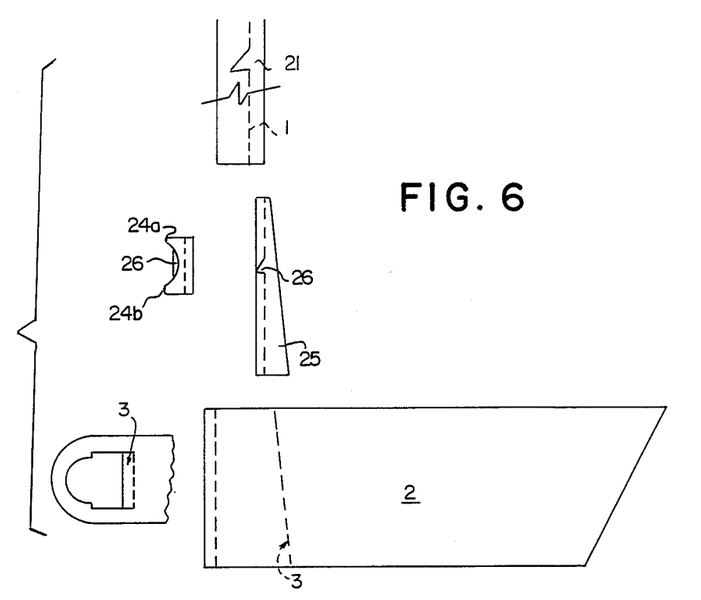
Figure 6A:
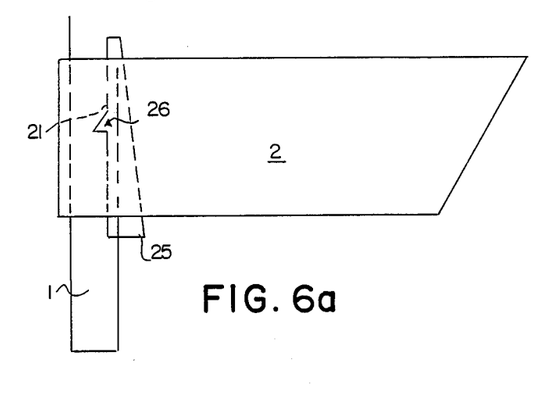

FIG. 3 which is a side view of the invention according to one preferred embodiment; and FIG. 4 which includes a side view of the body of the clamp member (in one preferred embodiment only); and a cross section of the preferred embodiment of the invention as shown in FIG. 3; and FIG. 5 which includes a side view and an end view of the wedge member shown in the preceding FIGS. 3 and 4 of the drawings; and FIG. 6 which includes views of the individual components and an assembled view of one embodiment of the invention Referring firstly to FIG. 1a of the drawings, there is disclosed an elongate member represented as a square elongate member (S) surrounded by a square collar member (C) which has a tapered recess 3 adapted to receive a wedge member (W) as shown. There are many devices in which an analogous arrangement is used to prevent movement of such a collar member along a round elongate member e.g. pipe and cable connectors.

Figure 1B:
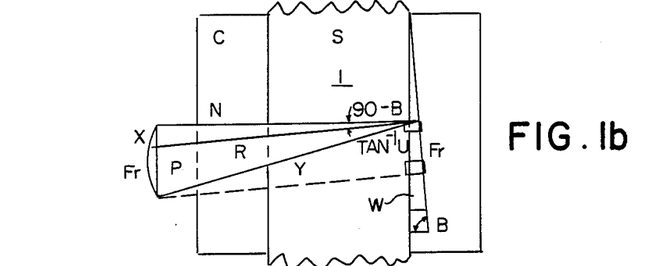

The letters referred to in FIGS. 1a and 1b are defined as follows:

TABLE I

| | |
|---|---|
| $Fr = R \times U_1$ Frictional Force = Coefficient × Force Normal to Surface | Fr force due to friction between W and C |
| $X = P - SINB \times Fr$ Net Vertical Force = P - Vertical Component of Fr | $U_1$ coefficient of friction between W and C |
| $R = X/COSB$ R = Reaction to Net Vertical Force = $(P - SINB \times R \times U_1)/COSB$ | P Force exerted by C on W |
| $RCOSB = P - SINB \times R \times U_1$ | R Normal load on W inducing Fr |
| | N Normal load on S limiting friction between S and W |
| $R(COSB + SINB \times U_1) = P$ $R = P/(COSB + SINB \times U_1)$ | B 90-B is the angle of taper of W |

TABLE I-continued $N = SINB \times R - COSB \times Fr$
N = Horizontal Component of R - Horizontal Component of
$Fr = SINB \times P/(COSB + SINB \times U_1) - COSB \times U \times P/(COSB + SINB \times U_1) = P(SINB - COSB \times U_1)/(COSB + SINB \times U_1)$
Alternatively $N = P/TAN(90 - B + TAN^{-1}U_1)$ The FIGS. 1a and 1b drawings are a 2× Scale of P=1 B=86° u=0.2

With reference to FIG. 1b of the drawings the general principle involved is that the wedge member (W) develops a powerful frictional contact with the elongate member (S) when a force as represented by P induces a reaction force N pressing the wedge member and elongate member into contact. A general problem with such arrangements is that the apparatus will only work when the frictional coefficient between the elongate member and the wedge member is significantly higher than the frictional coefficient between the collar member and the wedge member and where the angle of the wedge member is relatively small. It is common to enhance the coefficient of friction between the collar member and the elongate member by the addition of teeth-like projections on the inner surface of the wedge member. However, this approach will work only where the wedge member is as hard, or harder, than the elongate member which is not always possible. It can be seen that any apparatus which will augment the frictional force acting longitudinally between the wedge member and the elongate member for a given force N, normal to the wedge/elongate member interface, will have useful application.

A set of tabulated figures, showing the relationship between the force P and the normal force N which results, is displayed in Table II below. The general trend that the table indicates is that the force N increases as the frictional coefficient drops and decreases as the taper becomes steeper. Negative values indicate that the wedge member will not remain stationary on the elongate member because the force N is actually tending to lift the wedge member off the surface of the elongate member. Positive values do not indicate that the wedge member will remain stationary as there may still be insufficient pressure to generate adequate frictional resistance.

TABLE II

The table below shows values of N when P = 1
It is assumed that the wedge member doesn't move but in most cases it is appreciated that movement is likely.

| u Values | Taper deg | | | | | | |
|---|---|---|---|---|---|---|---|
| | 80 | 60 | 30 | 10 | 4 | 3 | 1 |
| 0.01 | 0.166 | 0.564 | 1.693 | 5.537 | 12.503 | 16.015 | 36.417 |
| 0.1 | 0.075 | 0.451 | 1.391 | 3.555 | 5.844 | 6.527 | 8.499 |
| 0.2 | −0.023 | 0.338 | 1.138 | 2.564 | 3.653 | 3.920 | 4.583 |
| 0.5 | −0.297 | 0.060 | 0.660 | 1.348 | 1.693 | 1.763 | 1.916 |
| 0.8 | −0.547 | −0.152 | 0.391 | 0.880 | 1.085 | 1.124 | 1.206 |
| 0.9 | −0.625 | −0.212 | 0.325 | 0.782 | 0.966 | 1.000 | 1.073 |

Figure 2:
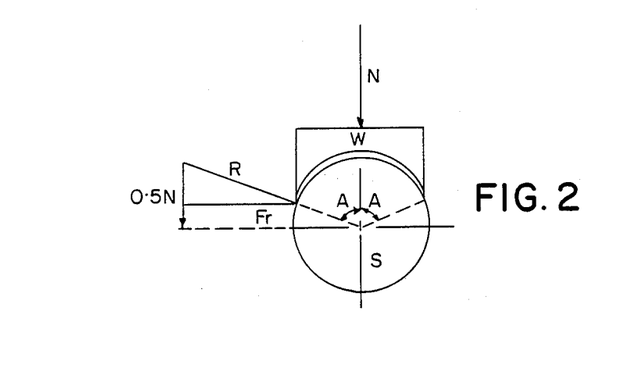

Turning now to FIG. 2, there is a diagrammatic representation of what might be assumed to be the same apparatus as described in the preceding drawing.

Firstly, it is necessary to analyse the forces affecting the wedge member using the assumption that the wedge member always has sufficient frictional contact with the elongate member to prevent it from moving along the elongate member. (For the purposes of the example, the wedge member can be envisaged as being attached to the elongate member, although this is not contemplated in practice). The net force which is acting normal to the longitudinal force P together with the co-efficient of friction and angle of contact of the wedge member and the elongate member will determine the frictional force which is generated between the elongate member and the wedge member. The relevant calculations are set out in Table III.

In FIG. 2 the wedge member meets the elongate member obliquely at two interfaces which share the force N supplied by the wedge member. If the interface between wedge and elongate member were frictionless then 0.5N (the load which one side of the wedge member carries) will have, as a component, a force (R=0.5N/COSA) which is normal to the interface between the wedge member (W) and the elongate member (S). Because the interface is not frictionless the force 0.5N is, to some degree, opposed by a frictional force (Fr=R*u) acting tangentially to the interface; this force has a component (Fr*SINA) which must be subtracted from 0.5N before R can be calculated, i.e.

```
Fr =                        R * u
R =                         (0.5 N − Fr * SINA)/COSA =
(0.5 N − R * u * SINA)/COSA
R * COSA =                  0.5 N − R u * SINA
R * COSA + R * u * SINA =   0.5 N
R =                         0.5 N/u * SINA + COSA
```

Assuming that N is equal to one (1) we can create the following table of values for R.

TABLE III

Frs = Rx U2
R = (0.5 N − Frs × SINA)/COSA
  = (0.5 N − R × U2 × SINA)/COSA
R × COSA = 0.5 N − R × U2 × SINA
R = 0.5 N/(U2 × SINA + COSA)
Frs = 0.5N × U2/(U2 × SINA + COSA)
TOTAL = 2 × Frs = FRT
  = N × U2/(U2 × SINA + COSA)
N = P/TAN (90 − B + TAN$^{-1}$U1)(From Table I)
FRT = P × U2/TAN(90 − B + TAN$^{-1}$U1)(U2 × SINA + COSA) FRT/P = U2/TAN(90 − B + TAN$^{-1}$U1)(U2 × SINA + COSA) = RATIO OF FRICTION ON SHAFT TO FORCE ON COLLAR Frs = Frictional force between each leg of W and S
R = Force normal to surface of S at point of contact with W generated by N
U2 = Coefficient of friction between W and S
FRT = Combined frictional force (both legs of W) between W and S
P = force exerted by collar C on wedge W in longitudinal direction

TABLE IV

| u Values | A degrees | | | | | | |
|---|---|---|---|---|---|---|---|
| | 5 | 10 | 20 | 30 | 60 | 70 | 80 |
| 0.01 | 0.501 | 0.507 | 0.530 | 0.574 | 0.983 | 1.423 | 2.725 |
| 0.1 | 0.498 | 0.499 | 0.513 | 0.546 | 0.852 | 1.147 | 1.837 |
| 0.2 | 0.493 | 0.490 | 0.496 | 0.518 | 0.743 | 0.943 | 1.349 |
| 0.5 | 0.481 | 0.467 | 0.450 | 0.448 | 0.536 | 0.616 | 0.751 |
| 0.8 | 0.469 | 0.445 | 0.412 | 0.395 | 0.419 | 0.457 | 0.520 |
| 0.9 | 0.465 | 0.438 | 0.401 | 0.380 | 0.391 | 0.421 | 0.472 |

Interpretation of Table IV provides the following information:
(a) As the angle of contact becomes more oblique the force which generates the frictional resistance between wedge member and the elongate member increases.
(b) As the coefficient of friction decreases the force R increases, however, the frictional force resisting movement along the elongate member is also inversely proportional to the coefficient of friction.
(c) As the angle of contact approaches zero the force R tends to 0.5 which is exactly what would be expected i.e. two contact points sitting squarely on a flat surface of the elongate member would share the load N between them - 0.5 N each. This is the situation applicable in a normal collet/cone/shaft system: there is no "multiplication" of force pressing the wedge member and the elongate member together.

This table provides an indication of frictional force opposing movement of the wedge member along the elongate member when the force applied (P)=1.

| u Values B | A degrees | | | |
|---|---|---|---|---|
| | 30 | 60 | 70 | 80 |
| | B degrees | | | |
| | 80 | 86 | 87 | 89 |
| 0.01 | 0.062 | 0.246 | 0.456 | 1.985 |
| 0.1 | 0.388 | 0.996 | 1.497 | 3.123 |
| 0.2 | 0.531 | 1.085 | 1.479 | 2.473 |
| 0.5 | 0.604 | 0.907 | 1.086 | 1.438 |
| 0.8 | 0.556 | 0.728 | 0.822 | 1.004 |
| 0.9 | 0.535 | 0.680 | 0.758 | 0.911 |

From the above table it is observed that:
(a) In each case it is assumed that the coefficient of friction is the same for each interface.
(b) Only those combinations of wedge taper, angle of contact and coefficient of friction associated with a value in the table which is greater than 1 are valid. i.e. in all other cases the wedge member will slide along the elongate member under the application of significant forces from the clamp member.
(c) Those values which are highest represent the most secure combinations which are less likely to be affected by changes in frictional coefficients induced by contamination with lubricants.
(d) As a general rule for situations in which coefficients of friction are approximately uniform (most practical situations) then wedge taper angles should be kept below 4 degrees, the angle of the plane of contact (angle A) should ideally be greater than 70 degrees and the optimum range for coefficients of friction is about 0.2 (this is a typical value for many plastics).
(e) If different coefficients of friction are used for the two interfaces then other viable combinations of taper angles (90-B) and contact angles (A) are possible but the same advantages of oblique, rather than square, contact still apply.

Finally, Table V, which is set out below, provides an indication of appropriate angles of taper and inclination of the wedge to the elongate member S within a range of co-efficients of friction. In this table u is the co-efficient of friction in the wedge—clamp body interface and u2 is co-efficient of friction of the wedge—elongate member interface. Table V is as follows:

TABLE V

| Degrees of Taper (90 - B)° | | A° degrees - Refer FIG. 2 | | | | | |
|---|---|---|---|---|---|---|---|
| | | 0 | 30 | 50 | 60 | 70 | 80 |
| 325 U1 = 0.1 U2 = 0.1 | 10 | 0.356 | 0.388 | 0.494 | 0.606 | 0.815 | 1.306 |
| | 9 | 0.381 | 0.416 | 0.529 | 0.649 | 0.874 | 1.400 |
| | 8 | 0.410 | 0.447 | 0.570 | 0.699 | 0.940 | 1.506 |
| Refer FIG. 1B | 7 | 0.443 | 0.484 | 0.616 | 0.756 | 1.017 | 1.629 |
| | 6 | 0.482 | 0.527 | 0.671 | 0.822 | 1.107 | 1.773 |
| 330 | 5 | 0.529 | 0.577 | 0.735 | 0.901 | 1.213 | 1.943 |
| | 4 | 0.584 | 0.638 | 0.812 | 0.996 | 1.340 | 2.147 |
| | 3 | 0.653 | 0.713 | 0.907 | 1.113 | 1.497 | 2.398 |
| | 2 | 0.739 | 0.806 | 1.027 | 1.259 | 1.694 | 2.714 |
| | | 0.850 | 0.928 | 1.181 | 1.449 | 1.949 | 3.123 |

| 335 (90 - B)° | | Degrees of Taper | | | | | |
|---|---|---|---|---|---|---|---|
| | | 0 | 30 | 50 | 60 | 70 | 80 |
| U1 = 0.2 U2 = 0.2 | 10 | 0.513 | 0.531 | 0.644 | 0.762 | 0.967 | 1.383 |
| | 9 | 0.540 | 0.559 | 0.679 | 0.803 | 1.020 | 1.458 |
| | 8 | 0.571 | 0.591 | 0.717 | 0.848 | 1.077 | 1.540 |
| 340 | 7 | 0.604 | 0.626 | 0.759 | 0.898 | 1.140 | 1.631 |
| | 6 | 0.642 | 0.664 | 0.806 | 0.953 | 1.211 | 1.732 |
| | 5 | 0.684 | 0.708 | 0.859 | 1.015 | 1.290 | 1.844 |
| | 4 | 0.731 | 0.756 | 0.918 | 1.085 | 1.379 | 1.971 |

TABLE V-continued

|  |  |  |  |  |  |  |  |
|---|---|---|---|---|---|---|---|
|  | 3 | 0.784 | 0.812 | 0.985 | 1.165 | 1.479 | 2.116 |
| 345 | 2 | 0.845 | 0.875 | 1.062 | 1.256 | 1.595 | 2.281 |
|  | 1 | 0.917 | 0.949 | 1.151 | 1.361 | 1.729 | 2.473 |

| Degrees of Taper | A° degrees - Refer FIG. 2 | | | | | |
|---|---|---|---|---|---|---|
| (90 - B)° | 0 | 30 | 50 | 60 | 70 | 80 |
| 350  U1 = 0.3 | 10 | 0.597 | 0.587 | 0.684 | 0.785 | 0.956 | 1.272 |
| U2 = 0.3 | 9 | 0.623 | 0.614 | 0.714 | 0.820 | 0.999 | 1.329 |
|  | 8 | 0.652 | 0.642 | 0.748 | 0.858 | 1.045 | 1.390 |
|  | 7 | 0.683 | 0.673 | 0.783 | 0.899 | 1.095 | 1.457 |
|  | 6 | 0.717 | 0.706 | 0.822 | 0.944 | 1.149 | 1.529 |
| 355 | 5 | 0.754 | 0.742 | 0.864 | 0.992 | 1.208 | 1.607 |
|  | 4 | 0.794 | 0.781 | 0.910 | 1.045 | 1.273 | 1.693 |
|  | 3 | 0.838 | 0.825 | 0.960 | 1.103 | 1.343 | 1.786 |
|  | 2 | 0.886 | 0.872 | 1.016 | 1.167 | 1.421 | 1.890 |
|  | 1 | 0.940 | 0.925 | 1.077 | 1.237 | 1.507 | 2.004 |

| 360 | Degrees of Taper | | | | | |
|---|---|---|---|---|---|---|
| (90 - B)° | 0 | 30 | 50 | 60 | 70 | 80 |
| U1 = 0.2 | 10 | 0.769 | 0.757 | 0.881 | 1.012 | 1.233 | 1.639 |
| U2 = 0.3 | 9 | 0.811 | 0.798 | 0.929 | 1.067 | 1.299 | 1.728 |
|  | 8 | 0.856 | 0.843 | 0.981 | 1.127 | 1.372 | 1.825 |
| 365 | 7 | 0.907 | 0.892 | 1.039 | 1.193 | 1.453 | 1.933 |
|  | 6 | 0.963 | 0.947 | 1.103 | 1.267 | 1.543 | 2.052 |
|  | 5 | 1.025 | 1.009 | 1.175 | 1.349 | 1.643 | 2.186 |
|  | 4 | 1.096 | 1.079 | 1.256 | 1.442 | 1.756 | 2.336 |
|  | 3 | 1.176 | 1.158 | 1.348 | 1.548 | 1.885 | 2.507 |
| 370 | 2 | 1.268 | 1.248 | 1.453 | 1.669 | 2.032 | 2.703 |
|  | 1 | 1.375 | 1.353 | 1.575 | 1.809 | 2.203 | 2.931 |

U1 = Wedge Member - Clamp member interface
U2 = Wedge Member - Elongate member interface
375 Table values represent ratio of FRT/p i.e. frictional force resisting applied force p The invention will now be described by way of example as to one possible application when the elongate member is a fence post, and the clamp member is intended for use (for example) as a connector member to receive and retain a fence wire on the elongate fence post. In particular, FIG. 3 is a side view of a clamping member according to one preferred embodiment of the invention wherein the clamp member is generally indicated by arrow 5. A clamp member includes a collar 6 with an elongate shaft 3 of a diameter approximately corresponding to the diameter of the elongate fence post 1, and with a recess 3a, formed with the adjacent shaft 3. The tapered recess 3a is adapted to receive the wedge member 4 and may be provided as a single recess, and a wedge having only one taper may be included in this type of clamp member.

However, in preferred embodiments as shown in the drawings, the recess 3a will be tapered inwardly from each end of the collar member 5. A wedge member 4 of the type shown in FIG. S of the drawings will then be provided to be used in conjunction with this type of recess. From FIG. 5 of the drawings it can be appreciated that the wedge member 4 includes two tapers 4a and 4b, which correspond with the taper provided in the recesses 3a and 3b. The cross section of the wedge member 4 is shown in FIG. 4 of the drawings. In preferred embodiments, the wedge member (in cross section) is substantially of a U-shape so that the inner surface of the wedge is provided with two projecting ridges 14a and 14b. The ridges are adapted to contact the elongate member 1 at two points about the surface of the elongate member. From the calculations disclosed in the specification and drawings, it will be appreciated that the upstanding portions 14a and 14b provide for twice the frictional contact of the wedge member on the elongate member. In preferred embodiments, where the clamp member is to be used on a substantially round elongate member such as an electric fence post, the inside wall of the wedge member 4 is preferably provided with a concave surface wherein the radius of the concave is slightly less than the radius of the elongate post member.

From the drawings, it will be readily appreciated that the exertion of pressure on the interface A—A will increase the contact of the two interfaces B—B, with the result that the pliable portions 14a and 14b will be inclined to be spaced further apart as the force is increased. This in turn will increase the frictional engagement of the wedge member on the surface of the elongate member.

The invention as disclosed may include a variety of different types of apparatus formed integrally with the clamping member. In the embodiment shown in FIGS. 3 and 4 of the drawings there is provided a simple form of wire connecter generally indicated by arrow 10 which includes a pair of upstanding engaging members 11a and 11b, the ends of which are overlapped as can be appreciated from the drawings. A fence wire is adapted to be passed through the space 12 between the upstanding portions, and is then received and engaged in the recess 13 provided by the overlapping end members 11a and 11b.

FIG. 6 illustrates a possible alternative or improvement to the oblique contact principle. The oblique contact principle relies on the compressive load between wedge 25 and post 1, being carried primarily on the arms of the wedge 25. Since the wedge 25 is resilient there comes a point when the portion of the compressive load carried on the arms 24a and 24b of the wedge represents a small portion of the total compressive force. This is because there is a maximum loading which can be imposed via the arms 24a and 24b i.e. when the wedge 25 has "bottomed" on the post. Additional load from this point on will fall entirely on the middle portion of the wedge 25.

This excessive loading is not likely to be a significant problem because the stiffness of the wedge 25 will generally be sufficient to ensure that the load is carried primarily on the arms of the wedge. However when an excessive loading is encountered "bottoming out" may occur depending upon the size of the wedge and hence its stiffness. A tooth 26 on the wedge 25 may therefore be provided to engage in the corresponding notch 21 on the post. This tooth-wedge combination provides the desired frictional bias between the post-wedge interface (A—A) and the wedge-shaft interface (B—B), such that slippage will always occur on the wedge-shaft (B—B) interface.

In general circumstances, the provision of a notch 21 on the post 1 may be undesirable as it could create a stress point and could limit the possible locations of a clamp member on the post. However, an excessive loading of the type referred to is likely to occur in respect of use of the clamp member in circumstances where it will always be required to be located in one particular position. One example of this is in the circumstance where the clamp member 2 is provided as and with an outwardly extending arm or pedal as a foot tread to press a fence post (port 1) into the ground. It will be appreciated that the tooth-notch combination even without the assistance of oblique contact by the arms 24a and 24b of the wedge 24 should provide a workable solution to the problem of removably fixing the collar member to a post where the connectors are subject to extensive loading—e.g. foot pedals on fence posts or heavy shelving. The tooth-notch combination could also be reversed.

There are a variety of alternative members which could be integrally formed with or attached to the clamp member. In particular, the apparatus could be provided as a support member for shelving where the frame is constructed of tubular materials. Furthermore, in fencing applications the apparatus could provide a variety of different types of apparatus to connect the wire to the fence post, only one of which has been shown in the drawings. Alternatively, the clamp member could be provided as a means of engaging a foot peg on a temporary fence post (as referred to in relation to FIG. 6).

Accordingly, by this invention there is provided a clamp member which is of simple design, and which enables the clamp member to be readily engaged and disengaged from an elongate member. Finally, it will be appreciated that the invention has been described by way of example only, and that modifications, alterations and additions may be made to the invention without departing from the scope thereof.

What I claim is:

1. A clamp member including a collar member having an internal bore to accommodate a substantially circular (in cross section) elongate member, the internal bore having at least one integral recess tapered with respect to the longitudinal axis of the elongate member; and at least one wedge member adapted, in use, to be positioned in the integral recess of the collar member between an inner surface of the collar and the surface of the elongate member; wherein an inner surface of said wedge member is shaped to provide at least two spaced apart areas of contact with the elongate member which areas of contact have tangent planes which are at an oblique angle one to the other; and wherein an outer surface of the wedge member is shaped to substantially correspond with the recess in the collar member, to provide an interface in which the included angle defined by any tangent planes of the recess—wedge interface substantially exceeds the included angle defined by any tangent planes to the elongate member—wedge member interface area, the arrangement being such that, in use the inner surface of the wedge member is substantially aligned with the surface of the elongate member by movement of the collar member in one direction, whereupon the two spaced apart areas of contact on the inner surface of the wedge member are frictionally engaged on the elongate member and the inner surface of the collar member is moved into frictional engagement with the outer surface of the wedge member to frictionally engage the collar member on the wedge member and elongate member; the clamp member being disengageable from the elongate member by moving the collar member in a direction opposite to said one direction.

2. A clamp member as claimed in claim 1, wherein the inner surface of the wedge member is, in cross section, of a lesser radius than the radius of the substantially circular (in cross section) elongate member to be inserted therein.

3. A clamp member as claimed in claim 1, wherein the longitudinal recess is tapered inwardly from at least one end of the collar member and wherein the wedge member has the outer surface thereof tapered from both ends substantially to correspond with the taper of the recess of the longitudinal recess.

4. A clamp member as claimed in claim 1, wherein the longitudinal recess is tapered from at least one end of the collar member and wherein the inner surface of the wedge member is, in cross section, of a lesser radius than the radius of the substantially circular (in cross section) elongate member to be inserted therein, the wedge member thus being adapted to contact the surface of the elongate member at the two areas of contact, the outer surface of the wedge member being tapered from at least one end substantially to correspond with the taper of the recess of the collar member.

5. A clamp member as claimed in claim 1, wherein the wedge member has an inner surface which is substantially curved in profile, and where the depending portions of the curved inner surface of the wedge member obliquely contact the elongate member, there being provided an area of non contact or clearance between the substantially circular (in cross section) elongate member and the inner portion of the curved inner surface of the wedge member.

6. A clamp member as claimed in claim 1, wherein the wedge member is constructed from an at least partially resilient material, in order that outer portions of a curved inner surface of the wedge member are, in use, adapted to be wedged at least partially apart, the wedge member thus being adapted to be held in constant compression within the recess in the collar member, in order to accommodate variations in the diameter of the elongate member or surface irregularities of the elongate member.

7. A clamp member as claimed in claim 1, wherein a first engagement element is provided on the inner surface of the wedge member, the first engagement element being positioned substantially between the two spaced apart areas of contact of the wedge member, the first engagement element being adapted to engage a corresponding second engagement element provided on the surface of the elongate member, the arrangement being such that the inner surface of the wedge is engageable with the elongate member, while at the same time the collar member is moveable relative to the outer surface of the wedge member.

8. A clamp member as claimed in claim 1, wherein the inner surface of the wedge member is, in cross section, of a lesser radius than the substantially circular (in cross section) elongate member to be inserted therein, the wedge member thus being adapted to contact the surface of the elongate member at the two areas of contact, the inner surface of the wedge member also being provided with a first engagement element, positioned substantially between the spaced apart areas of contact of the wedge member with the elongate member, the first engagement element being adapted to engage a corresponding second engagement element provided on the surface of the elongate member, the arrangement being such that the inner surface of the wedge is engaged with the elongate member, while at the same time the collar member is moveable relative to the outer surface of the wedge member.

9. A clamp member as claimed in claim 1, wherein the longitudinal recess is tapered inwardly from at least one end of the collar member and wherein the wedge member has an inner surface engageable with the elongate member and an outer surface which is tapered from both ends substantially to correspond with the taper of the recess of the collar member; the inner surface of the wedge member further being provided with a first engagement element, positioned substantially between the two spaced apart areas of contact of the wedge member with the elongate member, the first engagement element being adapted in use to engage a corresponding second engagement element provided on the surface of the elongate member; the arrangement being such that the inner surface of the wedge is engageable with the elongate member, while at the same time the collar member is moveable relative to the outer surface of the wedge member.

10. A clamp member as claimed in claim 1, wherein the said clamp member is adaped, to use, to engage an elongate member which is a substantially circular (in cross section) glass reinforced plastic fence post, wherein the collar member is provided with appropriate means to locate a fence wire, and wherein the collar member and wedge member are formed of an at least partially resilient plastic material which enables the clamp member to accommodate variations in the outer circumference of the substantially circular (in cross section) fence post.

11. A method of clamping a clamp member on an elongate member, wherein said clamp member includes a collar member with an internal bore, the internal bore to accommodate an elongate member and at least one integral recess tapered with respect to the longitudinal axis of the elongate member, and at least one wedge member adapted to be positioned in the integral recess in the collar member between the inner surface of the collar and the surface of the elongate member, comprising the steps of substantially aligning an inner surface of the wedge member with the surface of the elongate member by movement of the collar in a first direction, the inner surface of the elongate member and the collar member inclining towards frictional engagement with a tapered outer surface of the wedge member, thereby clamping on to the elongate member, and whereafter the clamp member is disengaged from the elongate member by movement of the collar member in a direction opposite to said first direction.

12. A method of clamping a clamp member on an elongate member as claimed in claim 11, where the said internal bore includes a longitudinal recess which is tapered from both ends of the collar member, and wherein the wedge member has an outer surface which is tapered from both ends substantially to correspond with the taper of the recess of the collar member.

13. A method of clamping a clamp member on an elongate member as claimed in claim 11, wherein the longitudinal recess is tapered outwardly from at least one end of the collar member and wherein the inner surface of the wedge member is engageable with the elongate member and the outer surface is tapered from both ends substantially to correspond with the taper of the recess of the collar member; and where the inner surface of the wedge member is adapted in use to engage the elongate member by providing a first engagement element, positioned substantially between the two spaced apart areas of contact of the wedge member with the elongate member, the first engagement element in use engaging a corresponding second engagement element provided on the surface of the elongate member; the arrangement being such that the inner surface of the wedge is engageable with the elongate member, while at the same time the collar member is moveable relative to the outer surface of the wedge member.

14. A clamp member including a collar member having an internal bore to accommodate a substantially circular (in cross section) elongate member, the internal bore having at least one integral recess tapered with respect to the longitudinal axis of the elongate member; and at least one wedge member adapted, in use, to be positioned in the integral recess of the collar member between an inner surface of the collar and the surface of the elongate member; wherein an inner surface of said wedge member is shaped to provide at least two spaced apart areas of contact with the elongate member which areas of contact have tangent planes which are at an oblique angle one to the other; and wherein an outer surface of the wedge member is shaped to substantially correspond with the recess in the collar member, to provide an interface in which the included angle defined by any tangent planes of the recess-wedge interface substantially exceeds the included angle defined by any tangent planes to the elongate member-wedge member interface area, the arrangement being such that, in use the inner surface of the wedge member is substantially aligned with the surface of the elongate member by movement of the collar member in one direction, whereupon the two spaced apart areas of contact on the inner surface of the wedge member are frictionally engaged on the elongate member and the inner surface of the collar member is moved into frictional engagement with the outer surface of the wedge member to frictionally engage the collar member on the wedge member and elongate member; the clamp member being disengageable from the elongate member by moving the collar member in a direction opposite to said one direction, wherein the longitudinal recess is tapered inwardly from at least one end of the collar member and wherein the wedge member has the outer surface thereof tapered from both ends substantially to correspond with the taper of the recess of the longitudinal recess.

15. A clamp member as claimed in claim 14, wherein the inner surface of the wedge member is, in cross section, of a lesser radius than the radius of the substantially circular (in cross section) elongate member to be inserted therein.

16. A clamp member as claimed in claim 14, wherein the wedge member has an inner surface which is substantially curved in profile, and where the depending portions of the curved inner surface of the wedge member obliquely contact the elongate member, there being provided an area of non contact or clearance between the substantially circular (in cross section) elongate member and the inner portion of the curved inner surface of the wedge member.

17. A clamp member as claimed in claim 14, wherein the wedge member is constructed from an at least partially resilient material, in order that outer portions of a curved inner surface of the wedge member are, in use, adapted to be wedged at least partially apart, the wedge member thus being adapted to be held in constant compression within the recess in the collar member, in order to accommodate variations in the diameter of the elongate member or surface irregularities of the elongate member.

18. A clamp member including a collar member having an internal bore to accommodate a substantially circular (in cross section) elongate member, the internal bore having at least one integral recess tapered with respect to the longitudinal axis of the elongate member; and at least one wedge member adapted, in use, to be positioned in the integral recess of the collar member between an inner surface of the collar and the surface of the elongate member; wherein an inner surface of said wedge member is shaped to provide at least two spaced apart areas of contact with the elongate member which areas of contact have tangent planes which are at an oblique angle one to the other; and wherein an outer surface of the wedge member is shaped to substantially correspond with the recess in the collar member, to provide an interface in which the included angle defined by any tangent planes of the recess-wedge interface substantially exceeds the included angle defined by any tangent planes to the elongate member-wedge member interface area, the arrangement being such that, in use the inner surface of the wedge member is substantially aligned with the surface of the elongate member by movement of the collar member in one direction, whereupon the two spaced apart areas of contact on the inner surface of the wedge member are frictionally engaged on the elongate member and the inner surface of the collar member is moved into frictional engagement with the outer surface of the wedge member to frictionally engage the collar member on the wedge member and elongate member; the clamp member being disengageable from the elongate member by moving the collar member in a direction opposite to said one direction, wherein a first engagement element is provided on the inner surface of the wedge member, the first engagement element being positioned substantially between the two spaced apart areas of contact of the wedge member, the first engagement element being adapted to engage a corresponding second engagement element provided on the surface of the elongate member, the arrangement being such that the inner surface of the wedge is engageable with the elongate member, while at the same time the collar member is moveable relative to the outer surface of the wedge member.

19. A clamp member as claimed in claim 18, wherein the inner surface of the wedge member is, in cross section, of a lesser radius than the radius of the substantially circular (in cross section) elongate member to be inserted therein.

20. A clamp member as claimed in claim 18, wherein the wedge member has an inner surface which is substantially curved in profile, and where the depending portions of the curved inner surface of the wedge member obliquely contact the elongate member, there being provided an area of non contact or clearance between the substantially circular (in cross section) elongate member and the inner portion of the curved inner surface of the wedge member.

21. A clamp member as claimed in claim 18, wherein the wedge member is constructed from an at least partially resilient material, in order that outer portions of a curved inner surface of the wedge member are, in use, adapted to be wedged at least partially apart, the wedge member thus being adapted to be held in constant compression within the recess in the collar member, in order to accommodate variations in the diameter of the elongate member or surface irregularities of the elongate member.

* * * * *